Nov. 1, 1966 A. C. STARR 3,282,509
OSCILLATING SPRINKLER
Original Filed Nov. 21, 1963 2 Sheets-Sheet 1
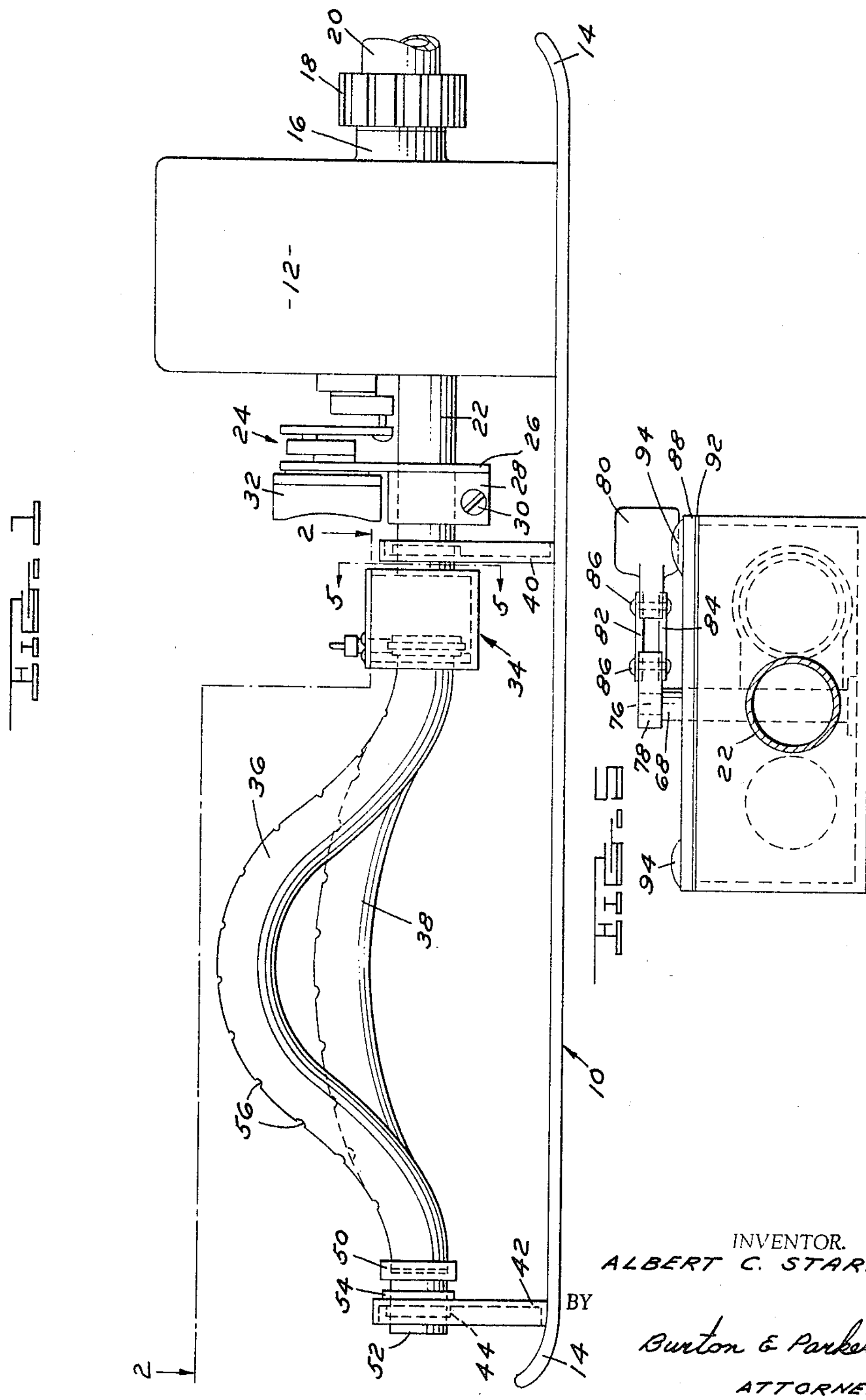
INVENTOR.
ALBERT C. STARR
BY
Burton & Parker
ATTORNEYS

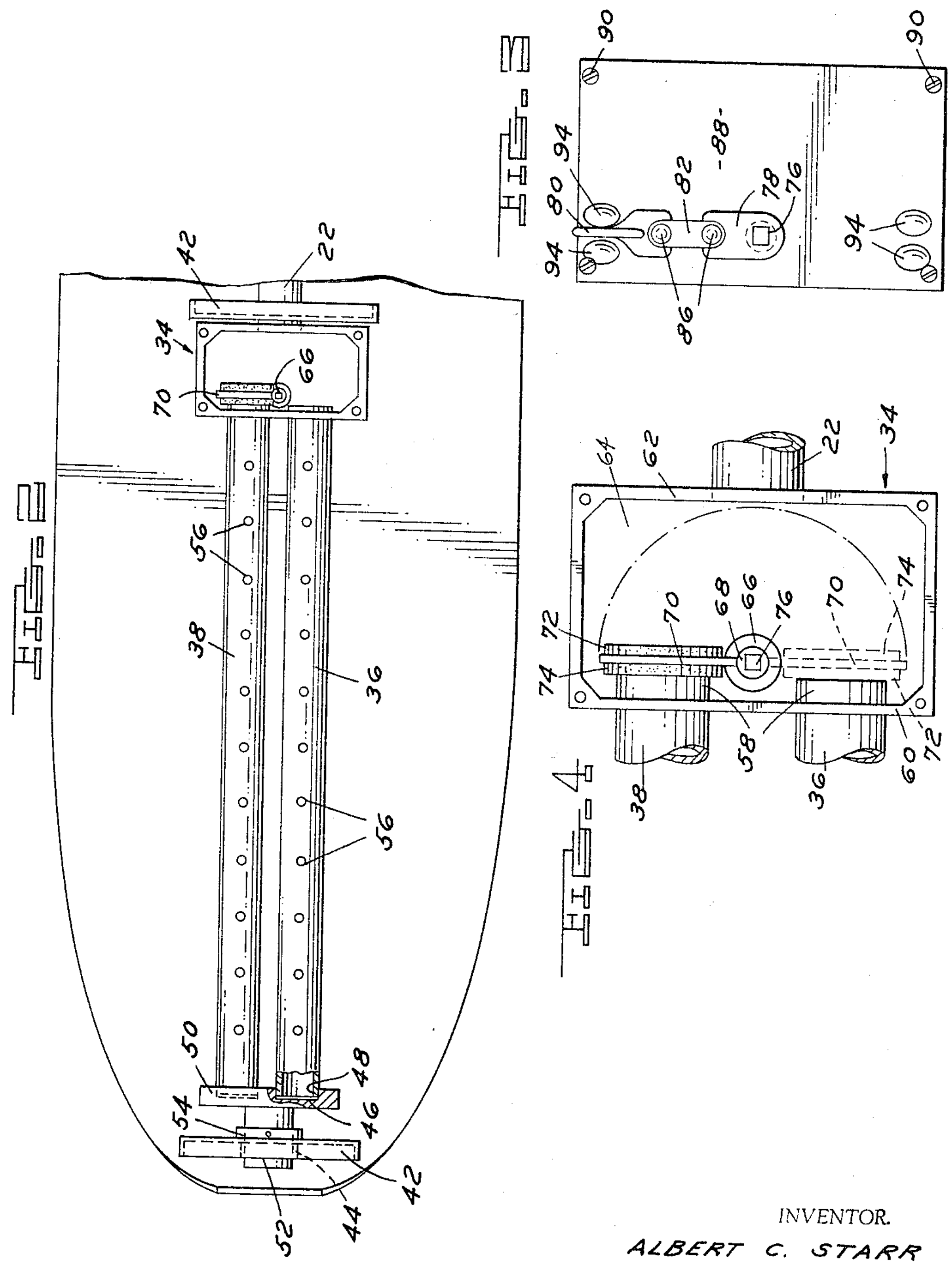
INVENTOR.
ALBERT C. STARR
BY
Burton & Parker
ATTORNEYS

United States Patent Office 3,282,509

Patented Nov. 1, 1966

3,282,509
OSCILLATING SPRINKLER

Albert C. Starr, 260 N. Main St., Nephi, Utah

Continuation of application Ser. No. 325,402, Nov. 21, 1963. This application Oct. 24, 1965, Ser. No. 504,731
2 Claims. (Cl. 239—242)

This is a continuation of my copending U.S. application Serial No. 325,402 filed November 21, 1963 and now abandoned.

This invention relates to lawn sprinklers, and more particularly to sprinklers of the oscillating type.

These so-called oscillating sprinklers in general comprise a horizontally disposed curved tube having spaced orifices therealong for directing water in a fan-shaped pattern. A small water turbine is used to oscillate the tube about a horizontal axis so that the spray traverses a back and forth path distributing the water over a generally rectangular area. Further, such sprinklers have been provided with means for changing the length of the arc through which the tube is oscillated.

While the oscillating sprinkler is considerably more versatile than previous designs in that it has the adjustability features above referred to, it nevertheless in its conventional form has various drawbacks. For example, in order to change the area of coverage, the rate of water flow must be varied, with a corresponding variation in water pressure driving the turbine, causing the sprinkler to oscillate at different speeds. Thus when watering a small area, both the rate of water flow and speed of oscillation are substantially reduced, thereby prolonging the watering process.

It is therefore an object to materially increase the versatility of lawn sprinklers of the oscillating type by providing a plurality of water distributing conduits or tubes on a single sprinkler, together with means for selectively coupling any one of the conduits to the water supply, with each conduit having different characteristics whereby the effective area of water coverage may be changed at will by the selection of an appropriate distributing conduit.

A specific object is the provision of an oscillating sprinkler having a main delivery conduit and a plurality of distributing conduits having different water-spraying characteristics, and means for selectively directing the flow of water through the main conduit into any one of the distributing conduits, whereby a desired spray pattern may be achieved.

Other objects, advantages and meritorious features will more fully appear from the following specification, claims and accompanying drawings, wherein:

FIG. 1 is a side elevation of an oscillating sprinkler embodying my invention;

FIG. 2 is a partial top plan view of the sprinkler taken along line 2—2 of FIG. 1;

FIG. 3 is a top plan view of the valve chamber of the sprinkler showing the valve actuating mechanism;

FIG. 4 is a top plan view similar to FIG. 3 with the chamber cover removed; and

FIG. 5 is an end view of the valve chamber taken along line 5—5 of FIG. 1.

Referring first particularly to FIG. 1, there is shown a sprinkler of the oscillating type comprising in general a base 10 upon which a water turbine housing 12 is supported containing a conventional water turbine (not shown) which need not be described in detail, as it is of well-known conventional construction. The opposite ends of the base 10 are preferably upturned as at 14 so that the sprinkler may be conveniently slid along the ground. Projecting from one side of housing 12 is a nipple 16 provided with the usual hose coupling 18 for attachment to a garden hose or the like 20.

Projecting from the opposite side of housing 12 is a main delivery conduit or pipe 22 which is oscillatable with respect to the housing, and is driven in its oscillatory path through the mechanical linkage generally indicated at 24. Any well-known linkage may be employed, and that shown includes a link 26 carrying a split sleeve 28 encircling conduit 22 and clamped thereto by means of a screw 30. The linkage also may include an adjustment feature, as is conventional, having an indicating dial 32 which may be rotated to different positions to vary the arc through which the conduit 22 is caused to oscillate.

The discharge end of main conduit 22 communicates with the interior of a box-like structure 34 which may be appropriately termed a valve chamber or a distributing chamber. Such is shown particularly in FIGS. 3, 4 and 5 and will be described in greater detail hereinafter. Extending from the opposite side of chamber 34 are a plurality of distributing conduits, two being shown in the drawings at 36 and 38, although it will be apparent that more than two may be provided if desired. The connections of main conduit 22 and distributing conduits 36, 38 with chamber 34 are rigid, so that all of these parts oscillate in unison. The assembly of these parts is supported for oscillation on suitable brackets or standards 40 and 42 which are secured to the base 10 in any convenient fashion, as by welding or the like. Brackets 40 and 42 are substantially identical, each provided with a bearing insert 44. As shown in FIG. 2, the ends of conduits 36 and 38 may be capped by suitable sealing gaskets 46 and are supports in counterbores 48 in a plate-like support 50, having a stub shaft 52 projecting therefrom journaled in bearing 44 on bracket 42. A collar 54 is secured to shaft 52 adjacent bracket 42 to prevent any appreciable longitudinal movement of the conduits with respect to the bracket.

Each of the distributing conduits, in this case 36 and 38, although more may be provided, exhibits a series of spaced water escape orifices 56 along its length through which water may flow. The orifices preferably vary in size from conduit to conduit, and in addition the conduits are of different curvatures, as is clearly shown in FIG. 1. Thus the pattern of coverage and the amount of water sprayed is determined by the configuration and orifice arrangement of the particular distributing conduit through which the water is flowing, which may be selected conveniently by the structure described below.

FIGS. 3, 4 and 5 show a preferred form of valve means housed in chamber 34 which may be employed to selectively open one distributing conduit while closing the other. As shown in FIG. 4, conduits 36 and 38 are provided with open end portions 58 which project slightly through a wall 60 of chamber 34, while main conduit 22 terminates in opposite wall 62. Secured to the bottom wall 64 of the chamber is a bearing collar 66 within which is seated for rotation a shaft 68 carrying a valve plate 70 secured thereto as by welding. On opposite sides of valve plate 70 are disposed the gaskets 72 and 74 which are adapted to sealingly seat against the projecting ends 58 of conduits 36 and 38 respectively. Gaskets 72 and 74 may be bonded or otherwise secured to plate 70, and are made of rubber or other suitable water-impervious gasket material.

Shaft 68 is of a polygonal configuration at its upper end, shown at 76. A valve actuating handle is provided comprising inner member 78 shaped to be received on shaft projection 76, and outer member 80. Members 78 and 80 are interconnected by a pair of strip steel spring elements 82 and 84 which may be riveted or bolted as at 86 to the members, as shown in FIGS. 3 and 5. A cover 88 is provided for chamber 34 and is secured thereto as by screws 90, with a gasket 92 under the cover to prevent escape of water from the chamber. Rigidly secured to cover 88 are two pairs of convex buttons 94, each pair being spaced apart a distance to accommodate the handle member 80 therebetween. The strips 82 and 84 permit slight yielding vertical movement of handle member 80 so that it can be slid over one of the buttons and positioned therebetween to hold the valve member stationary with one of the gaskets sealingly pressed against the projecting end of either conduit 36 or 38.

Thus it can be seen that my improved oscillating sprinkler adds versatility to the constructions in widespread usage by providing a plurality of separate distributing conduits conjointly oscillated by a water turbine through well-known linkage, and valve means operable to selectively open one of two distributing conduits to water flow while closing the remaining conduit. As the conduits are provided with variously sized and spaced spray orifices, and are of different curvatures, almost any size and shape of lawn or garden plot may be easily conveniently and efficiently irrigated with my sprinkler.

What is claimed is:

1. A lawn sprinkler comprising a base; a pair of bracket means mounted on and upstanding from the base in spaced apart alignment thereon; a main water delivery conduit journaled for oscillation in one of said bracket means; a closed water chamber communicatively coupled to said main conduit; a pair of apertured water distributing conduits communicatively coupled with said water chamber spaced from said main conduit and extending generally longitudinally of said base and terminating adjacent the other of said bracket means; support means for said distributing conduits journaled for oscillation in said other bracket, said main conduit, chamber, distributing conduits and support means defining a unitary structure conjointly oscillatable about a common axis; valve means associated with said chamber in flow-controlling communication with said distributing conduits and selectively operable to open one of said conduits while closing the other of said conduits; and motive means coupled to said main delivery conduit for oscillating such conduit and said delivery conduits conjointly.

2. The invention as defined in claim 1 wherein the valve means in the chamber is in the form of a valve plate shiftably supported within said chamber in flow-controlling communication with said distributing conduits to open one of said conduits to communication with the chamber to discharge water therefrom while closing the other conduit, and means is provided coupled with said plate and operable exteriorly of the chamber to selectively position said plate to open one of said conduits to communicate with the interior of the chamber for discharge of liquid therefrom through the conduit while closing the other of said conduits to the discharge of liquid from the chamber, that face of the plate opposite to the face adjacent to the conduit being exposed to the pressure of the liquid within the valve chamber whereby the plate is urged toward the end of the distributing conduit closed thereby.

No references cited.

M. HENSON WOOD, Jr., *Primary Examiner.*

V. C. WILKS, *Assistant Examiner.*